Figure 1:
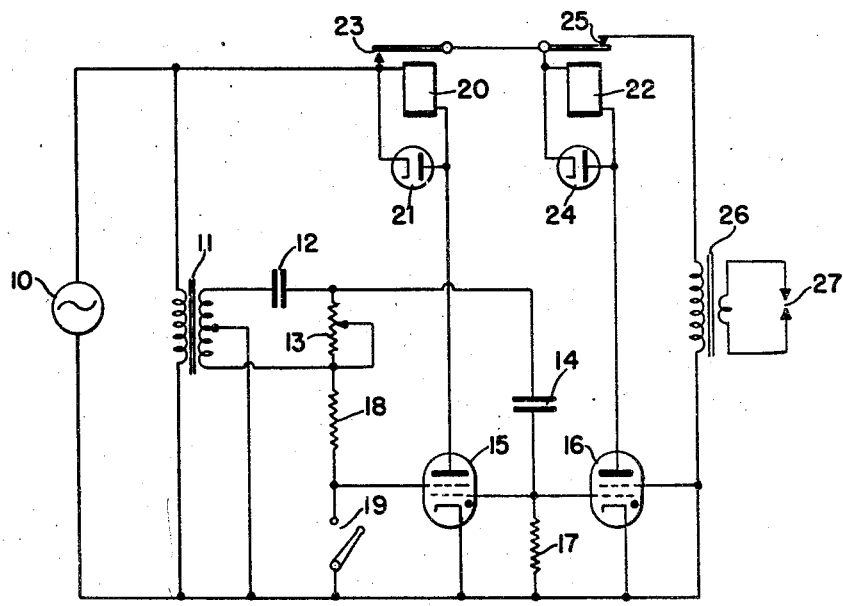

Dec. 3, 1946.   L. F. MAYLE   2,412,092
ELECTRONIC TIMER
Filed April 9, 1943

→ TIME

INVENTOR
LOUIS F. MAYLE
BY *[signature]*
ATTORNEY

Patented Dec. 3, 1946

2,412,092

UNITED STATES PATENT OFFICE 2,412,092

ELECTRONIC TIMER

Louis F. Mayle, Fort Wayne, Ind., assignor to Farnsworth Television and Radio Corporation, a corporation of Delaware Application April 9, 1943, Serial No. 482,391

9 Claims. (Cl. 175—372)

This invention relates to electronic timing devices, and particularly to a device of this character for timing the duration of the application of power to spot welding apparatus.

According to conventional spot welding practice using alternating current power, it is customary to supply power to the welding electrodes for very short intervals of time. This may be accomplished by using unilaterally conducting electronic devices which operate to energize the primary winding of the welding transformer for a predetermined fraction of an alternating current half cycle.

As is well understood in the art, however, a device of this character introduces a direct current component into the primary winding which tends to saturate the core of the transformer. In order to prevent saturation in such a device, a gap in the core of the transformer is provided. Such an expedient cannot be resorted to in an existing closed core transformer.

An object of the present invention therefore, is to provide an improved electronic timing device whereby core saturation of an intermittently energized alternating current transformer is prevented.

Another object of the invention is to provide an electronic timing device suitable for use in connection with spot welding apparatus whereby the welding transformer is energized for a predetermined number of complete alternating current cycles.

A further object of the invention is to provide an electronic device for timing the operation of an electromagnetic relay whereby the circuit controlling contacts of the relay are operated precisely at nodal points of the alternating current wave.

In accordance with the present invention there is provided a relay having contacts for controlling the energization of an inductive device such as a transformer winding. The relay is controlled by an electronic device which is rendered conducting to energize the winding of the relay sufficiently prior to the actuation of the relay contacts so as to effect the contact actuation at any predetermined point but preferably at a nodal point of the alternating current wave. The electronic device and the relay are connected to the same source of alternating current and the advance operation of the electronic device is effected through the agency of phase shifting network.

In order to effect the energization of a load circuit such as a welding transformer for a time precisely equal to the time of one complete cycle of the alternating current wave, two relays and respective electronic control devices are provided. The electronic devices are subjected similarly to control by the phase shifting network. The operation of one of the electronic devices controls the operation of one of the relays whereby the circuit to the welding transformer is closed. At the same time the output circuit of the second electronic device is closed to the alternating current source by the operated relay. The second electronic device is operated exactly one cycle later than the first device whereby the second relay is operated precisely one cycle later than the first relay. The operation of the second relay opens the circuit to the welding transformer so that it is energized only for one complete alternating current cycle.

For a better understanding of the invention together with other and further objects thereof, reference is had to the following description taken in connection with the accompanying drawing, and its scope will be pointed out in the appended claims.

Figure 2:
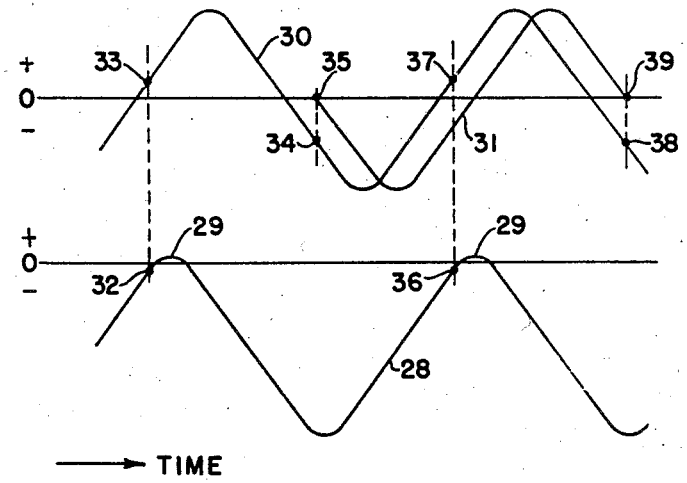

In the accompanying drawing:

Fig. 1 is a circuit diagram of the electronic timing device embodying the present invention; and Fig. 2 shows graphical representations of alternating voltage and current waves which are of assistance to an understanding of the operation of the apparatus.

Referring now more particularly to Fig. 1 of the drawing, a source of alternating current power 10 is connected to the primary winding of a transformer 11. The secondary winding of the transformer is connected to a phase-shifting network comprising the series arrangement of a condenser 12 and an adjustable resistor 13. The voltages appearing at the junction point between the condenser 12 and the resistor 13 are coupled by a condenser 14 to the control grids of a pair of electronic trigger devices such as the gas-filled tubes 15 and 16. The midpoint of the secondary winding of the transformer 11 is connected to the cathodes of these tubes and a grid resistor 17 is connected between the control grids and the cathodes of the tubes. The screen grid of the tube 15 is connected by a resistor 18 to the junction point between adjustable resistor 13 and the terminal of the secondary winding of transformer 11 whereby it is maintained at a negative potential with respect to the cathode to render the tube non-conducting during idle periods of the apparatus, irrespective of the potential of the control grid. The screen grid of the tube 16 is also connected to a switch 19 which may be closed to connect this grid to the cathode of the tube to condition the tube for conduction under the control of the control grid thereof. The screen grid of the tube 16 is connected directly to the cathode of this tube whereby this tube is always in condition to be rendered conducting in a manner to be described.

The anode of the tube 15 is connected through the operating winding of a circuit closing relay 20 to one terminal of the alternating current source 10. The winding of the relay 20 is shunted by means of a unilaterally conducting device such as a diode 21.

The anode of the tube 16 is connected through the operating winding of a circuit opening relay 22 to the armature of the make contact 23 of relay 20. The winding of relay 22 is also shunted by a diode 24. This relay is provided with a break contact 25 which is connected to one terminal of the primary winding of a spot welding transformer 26 forming a typical load circuit. The other terminal of the primary winding of this transformer is connected directly to one terminal of the alternating current source 10. The secondary winding of the transformer 26 is connected to the welding electrodes 27.

Referring now to the operation of the apparatus, assume that in Fig. 1 the switch 19 is open as shown and the relays 20 and 22 are deenergized so that their contacts 23 and 25 are in the respective open and closed positions as shown. The alternating voltage developed in the upper half of the secondary winding of the transformer 11 is impressed upon the control circuits of the tubes 15 and 16 by the series coupling condenser 14 and the shunt resistor 17.

When the positive potential is impressed upon the input circuits of the tubes 15 and 16, grid current flows into the condenser 14 until the control grids are at cathode potential. The time constant of the circuit including the condenser 14 and the resistor 17 is made large so that, following the charging of the condenser by the flow of grid current as described, the rate of discharge of the condenser is low. Consequently, grid current will flow in the tubes 15 and 16 only during the short time intervals occurring at the peaks of the positive half cycles of the alternating voltage wave. Therefore, the grids of the tubes 15 and 16 tend to maintain themselves at such a direct current potential that zero bias thereof corresponds to the maximum positive peaks of the alternating voltage wave. Such a condition is illustrated by the curve 28 of Fig. 2, which represents the control alternating voltage wave. Only the positive peaks 29 of the control alternating voltage wave are in the positive grid potential region. It is during this time that the control grids of the tubes 15 and 16 draw current to restore the potential of the condenser 14 sufficiently to maintain the control grids at cathode potential.

The curve 30 of Fig. 2 illustrates the alternating voltage wave as applied to the output circuits of the tubes 15 and 16, to the windings of the relays 20 and 22, and also to the primary winding of the welding transformer 26. Since it requires an elapse of time between the energization of the relay windings and the operating of the contacts thereof, the control voltage which is applied to the input circuits of the tubes 15 and 16 is advanced in phase with respect to the output circuit voltage. This is effected by the phase-shifting network including the condenser 12 and the adjustable resistor 13. The phase shift is illustrated by the position of the curve 28 with respect to the curve 30 of Fig. 2.

The curve 31 of Fig. 2 represents the alternating current wave through the welding transformer primary winding. It is seen to be delayed with respect to the output circuit alternating voltage wave 30 by reason of the lagging power factor of the transformer winding.

When it is desired to perform a welding operation, the switch 19 is closed. The screen grid of the tube 15 is thus placed at cathode potential rendering this tube susceptible to control by the control grid thereof. When the potential which is applied to the control grid by the phase-shifting network reaches a value corresponding to the point 32 on the curve 28 of Fig. 2, the control grid-to-cathode voltage is sufficient to trigger the tube, whereby to complete the anode-to-cathode circuit thereof. By referring to curve 30 of Fig. 2 it is seen that, at this time, the anode potential is represented by the point 33. Thus, there is initiated a current flow through the winding of the relay 20 and the anode-to-cathode path of the tube 15.

During the succeeding negative half cycle of the alternating voltage which is applied to the relay winding 20, the tube 15 will not function. In order to maintain energization of the winding of the relay 20 there is provided in shunt therewith the diode 21 which is poled to permit the circulation of current through the relay winding under the impetus of the energy stored in the inductive winding.

When the alternating voltage has reached a negative value corresponding to that of a point 34 on the curve 30, the lagging current in the welding transformer winding is at a nodal point 35 on the curve 31. At this time the winding of relay 20 is sufficiently energized to effect the closure of the contact 23.

Thus, a circuit is completed from the alternating current source 10 through the make contact 23 of relay 20 and the break contact 25 of relay 22 to the primary winding of the welding transformer 26. Also, the completion of this circuit occurs at the instant of a current reversal in this circuit so that the contact 23 does not have to conduct current until after it has closed. It will be seen that this result is obtained by adjusting the resistor 13 of the phase-shifting network to advance the phase of the control voltage applied to the tube 15 sufficiently to compensate for the delay in the response by the relay contact to the energization of the relay winding and for the power factor of the welding transformer winding.

When the alternating voltage which is applied to the input circuit of the tubes 15 and 16 reaches the point 36 on the curve 28 of Fig. 2, tube 16 again is triggered as previously described. Also, at this time the tube 16 fires since there now is connected to the anode thereof one terminal of the alternating current source. This connection includes the make contact 23 of relay 20 and the winding of relay 22. Consequently, at this time there is applied to the winding of relay 22 the alternating voltage represented by the point 37 of curve 30 of Fig. 2. The relays 20 and 22 are made identical in their operating characteristics so that the operation of the contact of relay 22 follows the winding energization by exactly the same time interval as in the corresponding sequence of events with respect to relay 20. Consequently, by the time the alternating voltage represented by the curve 30 of Fig. 2 has a negative value illustrated by the point 38 and the alternating current represented by the curve 31 reaches its next nodal point represented at 39, the break contact 25 of relay 22 opens the circuit to the primary winding of the welding transformer 26. Again, it is seen that the contact operation coincides with a no-current instant in the welding transformer primary winding circuit. Thus, the contact points are not subject to deterioration by arcing and the welding transformer is energized for the length of time corresponding precisely to the duration of one complete alternating current cycle.

The respective relay contacts 23 and 25 will remain in the last described positions until the switch 19 is opened. Obviously between the opening of the contact 25 and the opening of the switch 19 the welding transformer 26 is not energized again. The opening of the switch 19, of course, is random in time with respect to the alternating current. However, since the characteristics of the relays 20 and 22 are made identical, the release of these contacts following the opening of the switch 19 is concurrent. Thus, the circuit to the primary winding of the welding transformer is maintained in a deenergized state.

While it will be understood that the circuit specifications of the electronic timer may vary according to the design for any particular application, the following circuit specifications for a timer employed for spot welding apparatus are included by way of example only as follows:

A. C. source 10—230 volts
Transformer 11—Primary, 230 volts; secondary, 60 volts with center tap
Condenser 12—1 microfarad
Resistor 13—10,000 ohms
Condenser 14—0.1 microfarad
Tubes 15 and 16—2051
Resistor 17—560,000 ohms
Resistor 18—56,000 ohms
Tubes 21 and 24—1-V While there has been described what, at present, is considered the preferred embodiment of the invention, it will be obvious to those skilled in the art that various changes and modifications may be made therein without departing from the invention, and, therefore, it is aimed in the appended claims to cover all such changes and modifications as fall within the true spirit and scope of the invention.

What is claimed is:

1. Apparatus for controlling the energization of a load circuit comprising, a source of alternating current, a circuit closing relay having contacts operable to connect said load circuit to said source of alternating current, a circuit opening relay having contacts operable to disconnect said load circuit from said source of alternating current, and means including electronic timing apparatus coupled to said source of alternating current to effect successive operations of said respective relay contacts at predetermined corresponding points of different cycles of said alternating current, whereby to effect energization of said load circuit.

2. Apparatus for controlling the energization of a load circuit comprising, a source of alternating current, a circuit closing relay having make contacts operable to connect said load circuit to said source of alternating current, a circuit opening relay having break contacts operable to disconnect said load circuit from said source of alternating current, respective electronic gas-filled control devices to control the contact operations of said relays, and means including a circuit connected to said alternating current source to trigger said electronic devices successively at predetermined corresponding points of different cycles of said alternating current, whereby to effect energization of said load circuit.

3. Apparatus for controlling the energization of a load circuit comprising, a source of alternating current, a circuit closing relay having an operating winding and make contacts operable to connect said load circuit to said source of alternating current, a circuit opening relay having an operating winding and break contacts operable to disconnect said load circuit from said source of alternating current, respective electronic gas-filled control devices to control the energization of said relay windings, and a coupling circuit connected to said alternating current source to trigger said electronic devices successively at predetermined corresponding points of two successive cycles of said alternating current, whereby to effect energization of said load circuit for one complete alternating current cycle.

4. Apparatus for controlling the energization of a load circuit comprising, a source of alternating current, a circuit closing relay having an operating winding and make contacts operable to connect said load circuit to said source of alternating current, a circuit opening relay having an operating winding and break contacts operable to disconnect said load circuit from said source of alternating current, an electronic gas-filled control device for each of said relays, each device having an input circuit and an output circuit, the output circuits of said electronic devices being connected respectively to the windings of said relays, the winding of said circuit closing relay being connected permanently to said alternating current source and the winding of said circuit opening relay normally being disconnected from but adapted to be connected to said alternating current source by the contacts of said circuit closing relay, and a coupling circuit connected between said alternating current source and the input circuits of said electronic devices to trigger said devices successively at predetermined corresponding points of two successive cycles of said alternating current, whereby to effect energization of said load circuit for one complete alternating current cycle.

5. An electronic timer for controlling the energization of a load circuit comprising, a source of alternating current, a circuit closing relay having contacts operable to connect said load circuit to said source of alternating current, a circuit opening relay having contacts operable to disconnect said load circuit from said source of alternating current, two electronic control devices each having an output circuit, means including one of said output circuits to energize said circuit closing relay, means including the other of said output circuits and the contacts of said current closing relay to energize said circuit opening relay, the contacts of said relays requiring identical operating times following the energization of the respective relays, and means connected to said alternating current source to operate said electronic devices sufficiently in advance of the actuation of said relay contacts to cause said contact actuations coincidentally with the occurrence of predetermined points of said alternating current.

6. An electronic timer for controlling the energization of a load circuit comprising, a source of alternating current, a circuit closing relay having an operating winding and contacts operable to connect said load circuit to said source of alternating current, a circuit opening relay having an operating winding and contacts operable to disconnect said load circuit from said source of alternating current, two electronic control devices having input circuits connected for simultaneous control and individual output circuits, the winding of said circuit closing relay being energizable under the control of the output circuit of one of said electronic devices and the winding of said circuit opening relay being energizable under the control of the output circuit of the other of said electronic devices and the contacts of said circuit closing relay, the contacts of said relays requiring identical actuating times following the energization of the respective windings, and means connected between said source of alternating current and said input circuits to operate said electronic devices at times prior to the occurrence of nodal points of said alternating current equal to the actuating times of said relay contacts, whereby to cause said contact actuations coincidentally with the occurrence of said nodal points.

7. An electronic timer for controlling the energization of a load circuit comprising, a source of alternating current, a circuit closing relay having an operating winding and make contacts operable to connect said load circuit to said source of alternating current, a circuit opening relay having an operating winding and break contacts operable to disconnect said load circuit from said source of alternating current, two electronic control devices having input circuits connected for simultaneous control and output circuits connected respectively to the windings of said relays, the winding of said circuit closing relay being directly connected to said alternating current source and the winding of said circuit opening relay being normally disconnected from but adapted to be connected to said alternating current source by the contacts of said circuit closing relay, the contacts of said relays requiring identical actuating times following the energization of the respective windings, and means including a phase-shifting network connected between said source of alternating current and said input circuits to operate said electronic devices at times prior to the occurrence of two successive nodal points of said alternating current equal to the actuating times of said relay contacts, whereby to cause said contact actuations coincidentally with the occurrence of said nodal points.

8. An electronic timer for controlling the energization of a load circuit comprising, a source of alternating current, a circuit closing relay having an operating winding and make contacts operable to connect said load circuit to said source of alternating current, a circuit opening relay having an operating winding and break contacts operable to disconnect said load circuit from said alternating current source, two electronic control devices having input circuits connected for simultaneous control and output circuits connected respectively to the windings of said relays, the winding of said circuit closing relay being directly connected to said alternating current source and the winding of said circuit opening relay being normally disconnected from but adapted to be connected to said alternating current source by the contacts of said circuit closing relay, the contacts of said relays requiring identical operating times following the energization of the respective windings, a coupling circuit between said alternating current source and the input circuits of said electronic devices to effect operation of said devices, and a phase-shifting network included in said coupling circuit to operate said electronic devices sufficiently in advance of the operation of said relay contacts to effect said contact operations coincidentally with the occurrence of nodal points of the alternating current applied thereto.

9. Timing apparatus comprising, a source of alternating current, a circuit closing relay having normally open contacts operable to establish a connection to said source, a circuit opening relay having normally closed contacts connected in series with said normally open contacts and operable to disestablish a connection to said source, and means including electronic apparatus having input circuit electrodes coupled directly to said source and output circuit electrodes coupled to said source through said relays to effect successive operations of said respective relays at predetermined corresponding points of different cycles of said alternating current.

LOUIS F. MAYLE.